US010526201B2

(12) United States Patent
Abdulrahman

(10) Patent No.: US 10,526,201 B2
(45) Date of Patent: Jan. 7, 2020

(54) MATERIAL SUBSTITUTION OF CUPROUS CHLORIDE MOLTEN SALT AND OXYGEN GAS IN THE THERMOLYSIS REACTOR OF HYDROGEN PRODUCTION CU—CL CYCLE

(71) Applicant: Mohammed Wassef Abdulrahman, Oshawa (CA)

(72) Inventor: Mohammed Wassef Abdulrahman, Oshawa (CA)

(73) Assignee: Mohammed Wassef Abdulrahman, Oshawa (CA)

( * ) Notice: Subject to any disclaimer, the term of this patent is extended or adjusted under 35 U.S.C. 154(b) by 382 days.

(21) Appl. No.: 15/210,782

(22) Filed: Jul. 14, 2016

(65) Prior Publication Data

US 2017/0015551 A1   Jan. 19, 2017

Related U.S. Application Data

(60) Provisional application No. 62/192,518, filed on Jul. 14, 2015.

(51) Int. Cl.
*C01B 3/06* (2006.01)
*B01J 7/00* (2006.01)
*B01J 19/00* (2006.01)
*C01G 3/05* (2006.01)

(52) U.S. Cl.
CPC ............... *C01B 3/068* (2013.01); *B01J 7/00* (2013.01); *B01J 19/006* (2013.01); *B01J 19/0013* (2013.01); *C01G 3/05* (2013.01); *B01J 2219/00015* (2013.01); *B01J 2219/0059* (2013.01); *B01J 2219/00123* (2013.01); *B01J 2219/00594* (2013.01); *B01J 2219/00596* (2013.01); *B01J 2219/00745* (2013.01); *B01J 2219/00763* (2013.01); *B01J 2219/00768* (2013.01)

(58) Field of Classification Search
CPC .... B01J 2219/00015; B01J 2219/00243; B01J 2219/007; B01J 19/0046; B01J 19/0013; B01J 19/0006; C01B 19/0033; G06F 17/12; G06F 17/50; G06F 2217/06; G06F 2217/80; G16C 20/10; G16C 20/30
See application file for complete search history.

(56) References Cited

U.S. PATENT DOCUMENTS 8,628,725 B2   1/2014  Gabriel et al.
2014/0348742 A1  11/2014  Dadasaheb et al.

FOREIGN PATENT DOCUMENTS

EP          0 761 298 A2    3/1997

OTHER PUBLICATIONS

Rudlsuli, Martin et al. "Scale-up of buddling fluidized bed reactors—A review." Powder Technology (2012) 217 21-38. (Year: 2012).*
Office Action and Notice of References Cited dated Jan. 24, 2017 in corresponding U.S. Appl. No. 15/210,806.
Office Action and Notice of References Cited dated Sep. 11, 2017 in corresponding U.S. Appl. No. 15/210,806.
Notice of Allowance dated Mar. 23, 2018 in corresponding U.S. Appl. No. 15/210,806.
Abdulrahman, M. W. (2016). Similitude for thermal scale-up of a multiphase thermolysis reactor in the Cu—Cl cycle of a hydrogen production. World Academy of Science, Engineering and Technology, International Journal of Electrical, Computer, Energetic, Electronic and Communication Engineering, 10 (5), 567-573.
Abdulrahman, M. W. (2016). Heat transfer analysis of a multiphase oxygen reactor heated by a helical tube in the Cu—Cl cycle of a hydrogen production. World Academy of Science, Engineering and Technology, International Journal of Mechanical, Aerospace, Industrial, Mechatronic and Manufacturing Engineering, 10 (6), 1018-1023.
Borgnakke, C., & Sonntag, R. E. (2009). Fundamentals of Thermodynamics (7th ed.). Appendix A Sl Units: Single-State Properties, p. 761, USA: John Wiley & Sons, Inc.
Janz, G. J. (1988). Thermodynamic and transport properties for molten salts: Correlation equations for critically evaluated density, surface tension, electrical conductance, and viscosity data. Journal of Physical and Chemical Reference Data, 17, Supplement No. 2, pp. 125.
Lemmon, E. W., & Jacobsen, R. T. (2004). Viscosity and thermal conductivity equations for nitrogen, oxygen, argon, and air, International Journal of Thermophysics, 25, (1), 21-69.
Lewis, M. A, Serban, M. & Basco, J.K. (2003). Hydrogen production at <550° C. using a low temperature thermochemical cycle. Second Information Exchange Meeting, Argonne, Illinois, USA, pp. 145-156.
Marin, G. D. (2012). Kinetics and transport phenomena in the chemical decomposition of copper oxychloride in the thermochemical Cu—Cl cycle (Doctoral dissertation). University of Ontario Institute of Technology, Ontario, Canada.
McCutcheon, S. C., Martin, J. L., & Barnwell, T. O. (1993). Water quality. In D. R. Maidment (Editor), Handbook of Hydrology (p. 11.3). New York: McGraw-Hill.
Morrison, T. J., & Johnstone, N. B. (1954). Solubilities of the inert gases in water. Journal of Chemical Society, 3441-3446.

(Continued)

*Primary Examiner* — Christopher Adam Hixson

(57) ABSTRACT

In the thermochemical water splitting process by the Cu—Cl cycle, oxygen gas is produced by a thermolysis process in a three-phase reactor. A precise knowledge of the hydrodynamic and heat transfer analyses is required for the scale-up of the thermolysis reactor. However, in the experimental studies of the scale up analysis, there are some challenges in using the actual materials of the thermolysis reactor products (i.e. molten salt CuCl and oxygen gas). In accordance with the teachings herein, alternative materials are defined, by using dimensional analyses, to simulate the hydrodynamic and heat transfer behaviors of the actual materials. It has been found that these alternative materials are liquid water at 22±2° C. and helium gas at 90±2° C. The alternative materials provide safe environment for the experimental runs as well as lower operating temperature. Furthermore, these alternative materials are more readily available and are low cost.

4 Claims, 3 Drawing Sheets

(56) References Cited

OTHER PUBLICATIONS

Naterer, G. F., Gabriel, K., Wang, Z. L., Daggupati, V. N., & Gravelsins, R. (2008). Thermochemical hydrogen production with a copper-chlorine cycle. I: Oxygen release from copper oxychloride decomposition. International Journal of Hydrogen Energy, 33, 5439-5450.

Osborne, N. S., Stimson, H.F. & Ginnings, D.C. (1939). Measurements of heat capacity and heat of vaporization of water in the range 0° to 100° C. Part of Journal of Research of the National Bureau of Standards, vol. 23, p. 238.

Petersen, H. (Sep. 1970). The properties of helium: Density, specific heats, viscosity, and thermal conductivity at pressures from 1 to 100 bar and from room temperature to about 1800 K Risö Report No. 224. Danish atomic energy commission research establishment Risö, pp. 1-42.

Ramires, M. L. V., Nieto de Castro, A., Nagasaka, Y., Nagashima, A., Assael, M. J., Wakeham, W. A. (1994). Standard reference data for the thermal conductivity of water. American Institute of Physics and the American Chemical society, pp. 1377-1381.

Viswanath, D.S., Ghosh, T., Prasad, D.H., Dutt N.K. & Rani, K.Y. (2007). Viscosity of liquids: theory, estimation, experiment, and data. Dordecht, NL: Springer, p. 199.

Robert, F. B., (2003). Direct contact heat transfer. In A. Bejan, & A. D. Kraus (Eds.), Heat transfer handbook (p. 1374). John Wiley & Sons, Inc.

Serban, M., Lewis, M. A., & Basco, J. K. (Apr. 2004). Kinetic study of the hydrogen and oxygen production reactions in the copper-chloride thermochemical cycle. American Institute of Chemical Engineers Journal, Spring National Meeting, New Orleans, LA, pp. 2-10.

Sonin, A. A. (2001). The physical basis of dimensional analysis (2nd ed.), Department of Mechanical Engineering, Cambridge, pp. 1-57.

Vargaftik, N. B., Volkov, B. N., & Voljak, L. D. (1983). International tables of the surface tension of water. Moscow Aviation Institute, Moscow, U.S.S.R. Journal of Physical and Chemical Reference Data, 12 (3), 817-820.

Zamfirescu, C., Dincer, I., & Naterer, G. F. (2010). Thermophysical properties of copper compounds in copper-chlorine thermochemical water splitting cycles. International Journal of Hydrogen Energy, 35, 4839-4852.

Abdulrahman, M. W. (2015). Experimental studies of direct contact heat transfer in a slurry bubble column at high gas temperature of a helium-water-alumina system. Applied Thermal Engineering, 91, 515-524.

Abdulrahman, M. W. (2016). Experimental studies of the transition velocity in a slurry bubble column at high gas temperature of a helium-water-alumina system. Experimental Thermal and Fluid Science, 74, 404-410.

Abdulrahman, M. W. (2016). Experimental studies of gas holdup in a slurry bubble column at high gas temperature of a helium-water-alumina system. Chemical Engineering Research and Design, 109, 486-494.

Abdulrahman, M. W., Wang, Z., & Naterer, G. F. (2013). Scale-up analysis of three-phase oxygen reactor in the Cu—Cl thermochemical cycle of hydrogen production. EIC Climate Change Technology Conference 2013 (CCTC2013) Paper No. 1569694427. Montreal, Canada, pp. 1-11.

Bevington, P. R., & Keith, R. (2003). Data Reduction and Error Analysis for the Physical Sciences (3rd ed.). McGraw-Hill, New York, pp. 1-320.

Kline, S. J., & McClintock, F. A. (1953). Describing uncertainties in single-sample experiments. Journal of Mechanical Engineering, 75, 3-8.

\* cited by examiner

MATERIAL SUBSTITUTION OF CUPROUS CHLORIDE MOLTEN SALT AND OXYGEN GAS IN THE THERMOLYSIS REACTOR OF HYDROGEN PRODUCTION CU—CL CYCLE

CROSS-REFERENCE

This application claims the benefit of U.S. Provisional Patent Application No. 62/192,518 filed Jul. 14, 2015; the entire contents of Patent Application No. 62/192,518 are hereby incorporated by reference.

FIELD

Various embodiments are described herein for the experimental hydrodynamic and thermal scale-up analysis of a thermolysis reactor in the thermochemical Cu—Cl cycle of hydrogen production, in which safer and less temperature intensive alternative materials are used instead of some of the challenging and high temperature actual conventional materials.

BACKGROUND

The copper-chlorine (Cu—Cl) cycle was identified as one of the promising lower temperature cycles to produce hydrogen (Lewis et al., 2003; Serban et al., 2004). The Cu—Cl cycle includes three chemical reactions to decompose water into hydrogen and oxygen. Two of the chemical reactions are thermal and one is an electrochemical reaction. The three reaction steps of the Cu—Cl cycle (FIG. 1) are (Marin, 2012; Abdulrahman, 2016a; Abdulrahman, 2016b):

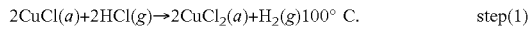

$$2CuCl(a)+2HCl(g) \rightarrow 2CuCl_2(a)+H_2(g) 100°\ C. \qquad \text{step}(1)$$

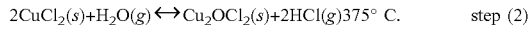

$$2CuCl_2(s)+H_2O(g) \leftrightarrow Cu_2OCl_2(s)+2HCl(g) 375°\ C. \qquad \text{step (2)}$$

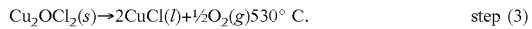

$$Cu_2OCl_2(s) \rightarrow 2CuCl(l)+\tfrac{1}{2}O_2(g) 530°\ C. \qquad \text{step (3)}$$

where a, s, l and g denote aqueous, solid, liquid and gas, respectively. These three reaction steps of the Cu—Cl cycle are shown in FIG. 1.

In the oxygen production step of the Cu—Cl cycle (i.e. step 3), solid copper oxychloride ($Cu_2OCl_2$) is decomposed thermally into oxygen gas ($O_2$) and molten cuprous chloride (CuCl). The solid $Cu_2OCl_2$ is fed to an oxygen production reactor (i.e. a thermolysis reactor) from the $CuCl_2$ hydrolysis reaction (i.e. step 2) that operates at a temperature range of 350-450° C. The materials leaving the thermolysis reactor are oxygen gas (which is evolved over a temperature range of 450 to 530° C.) and molten CuCl. In the thermolysis reactor, the decomposition of $Cu_2OCl_2$ to oxygen and molten CuCl is an endothermic reaction requiring a reaction heat of 129.2 kJ/mol and a temperature of 530° C., which is the highest temperature in the Cu—Cl cycle. Thus, heat must be added to increase the temperature of the bulk material inside the thermolysis reactor. The total amount of heat required is the sum of reaction heat and the heat required to raise the reactant temperature from 375° C. (the average temperature of solid particles from the hydrolysis reaction) to 530° C. (Naterer et al. 2008b; Abdulrahman, 2016a).

The design and scale-up (i.e. geometric and production scaling) of the thermolysis reactor must be studied from different perspectives, such as; kinetics, hydrodynamics, mass and heat transfer. In order to scale up the thermolysis reactor from the perspectives of the hydrodynamics and heat transfer, it is necessary to conduct some experiments to describe the hydrodynamic and thermal behaviors. However, experimentally, there are some challenges in using the actual products of the thermolysis reactor (i.e. $O_2$ and CuCl) at the operating conditions of the thermolysis reactor. The challenges are: 1) the cuprous chloride (CuCl) has a high melting temperature of 430° C., 2) the color of CuCl after melting is a non-transparent dark grey, which makes it difficult to see oxygen bubbles inside it, 3) the cuprous chloride molten salt is very corrosive, 4) the oxygen gas is a strong oxidizing agent which will quickly combust materials, and 5) it is a high temperature process.

SUMMARY OF VARIOUS EMBODIMENTS

The embodiments described herein provide a technical solution to the problems and challenges associated with the use of some of the actual conventional materials in a thermolysis reactor for producing hydrogen using the thermochemical copper-chlorine (Cu—Cl) cycle by selecting alternative materials that are safer and less temperature intensive. The alternative materials can be used in the scale up analysis of the thermolysis reactor, to determine the hydrodynamic and thermal behaviors of the actual materials experimentally.

In a broad aspect, at least one embodiment described herein provides a method of scaling-up a reactor by experimenting with at least one alternative material instead of an actual material that is used in the reactor. The method comprises selecting a study that is needed to be performed in the scale-up analysis; identifying a set of parameters that affect the study; performing dimensionless analyses on the set of parameters to select the at least one alternative material; performing experiments with the selected at least one alternative material; and defining one or more parameters of the reactor for actual use based on results of the experiments.

In at least some embodiments, the act of identifying a set of parameters comprises identifying a physical parameter of interest as a dependent parameter for a chemical reaction of the reactor; and identifying independent parameters that have a significant effect on the dependent variable in the context of the study and defining relationships between the independent parameters and the dependent parameter.

In at least some embodiments, the act of performing dimensionless analysis comprises converting the relationships into dimensionless groups using the Buckingham pi theorem and omitting dimensionless groups having fixed values; and selecting the at least one alternative material when the physical properties of the at least one alternative material match those of at least one actual material being replaced for each independent dimensionless group.

In at least some embodiments, the dimensionless analysis comprises fixing the dimensions of the reactor and substituting one or more the materials used in a chemical reaction in the reactor.

In at least some embodiments, the study comprises hydrodynamics and heat transfer behaviour.

In at least some embodiments, the reactor is used for the thermochemical Cu—Cl cycle of hydrogen production and the at least one alternative material comprises liquid water at 22±2° C. instead of CuCl molten salt at 530° C. and helium gas at 90±2° C. instead of oxygen gas at 530° C.

In at least one of such embodiments, the act of performing experiments comprises filling the reactor with the liquid water to a certain height and injecting the helium gas from the bottom of the reactor to emulate an upward motion of oxygen gas as it is conventionally produced by a decomposition process in the thermochemical Cu—Cl cycle.

In at least one of such embodiments, the helium gas is injected at different speeds to study hydrodynamic behavior.

In at least one of such embodiments, dimensionless numbers that are obtained from experiments with the alternative materials comprise $Nu_V$, $\alpha_g$, and $Re_{g\text{-}trans}$.

In another broad aspect, at least one embodiment described herein provides a reactor vessel for performing experiments for scale-up analysis of a reactor. The reactor vessel comprises a housing; a reaction chamber within the housing; and at least one alternative material in the reaction chamber that is determined using dimensionless analysis.

In at least some embodiments, the dimensionless analysis comprises using the Buckingham pi theorem and fixing the dimensions of the thermolysis reactor and substituting at least one of product materials and associated operating condition.

In at least some embodiments, the at least one alternative component is defined for a given phase of the thermolysis reactor.

In at least some embodiments, the scale-up analysis of the reactor is used for the thermochemical Cu—Cl cycle of hydrogen production and the at least one alternative material that provides similar conditions in the thermolysis reactor in terms of hydrodynamics and heat transfer comprise liquid water at 22±2° C. instead of CuCl molten salt at 530° C. and helium gas at 90±2° C. instead of oxygen gas at 530° C.

In at least some embodiments, the reactor vessel is filled with the liquid water to a certain height and the helium gas is injected from the bottom of the reactor vessel to emulate an upward motion of oxygen gas as it is conventionally produced by a decomposition process in the thermochemical Cu—Cl cycle.

In at least some embodiments, the helium gas is injected at different speeds to study hydrodynamic behavior.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
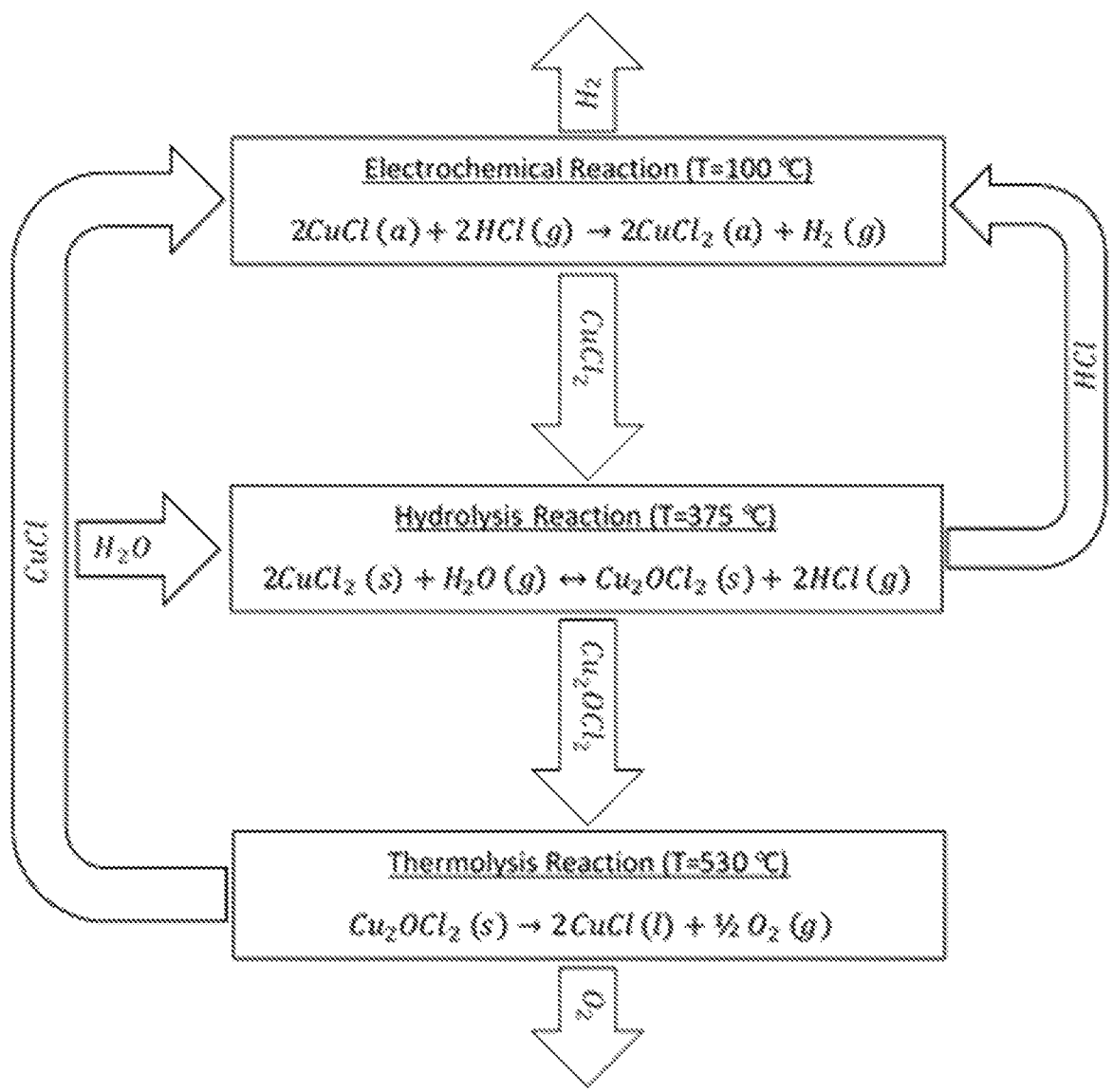
FIG. 1 shows the three reaction steps of the Cu—Cl cycle.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the systems or methods described below or to features common to multiple or all of the systems and/or methods described herein. It is possible that there may be a system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 5% or 10%, for example, as the case may be.

In one aspect, at least one example embodiment is described herein for hydrogen production using the thermochemical copper-chlorine (Cu—Cl) cycle in which the oxygen production step uses safer and less temperature intensive alternative materials instead of some of the challenging and high temperature actual conventional materials that are used in the multiphase oxygen production reactor (thermolysis reactor). The alternative materials may be treated easily and safely in experiments and also simulate the industrial conditions of the thermolysis reactor from the perspectives of hydrodynamics and heat transfer. In other words, these alternative materials are suitable for use in the lab and give similar effects as the actual conventional materials in hydrodynamic and heat transfer studies.

In another aspect, at least one example embodiment described herein provides a commercially practicable setup for the experiments of a difficult-to-handle setup.

For example, in at least one embodiment, by using dimensional analysis, alternative materials were found that can be used in the experiments instead of CuCl molten salt at 530° C. and oxygen gas at 530° C. The alternative materials are liquid water at 22±2° C. and helium gas at 90±2° C. respectively. The advantages of these alternative materials are the availability of the alternative materials, the safe usage of these alternative materials in the lab, and the low temperature used in the experimental testing.

It should be understood that while the teachings herein are provided within the context of an example involving the experimental hydrodynamic and thermal scale-up analysis of a thermolysis reactor in the thermochemical Cu—Cl cycle of hydrogen production, the teachings herein can also be used for any other case in which alternative materials are needed for chemical reactions.

Figure 2:
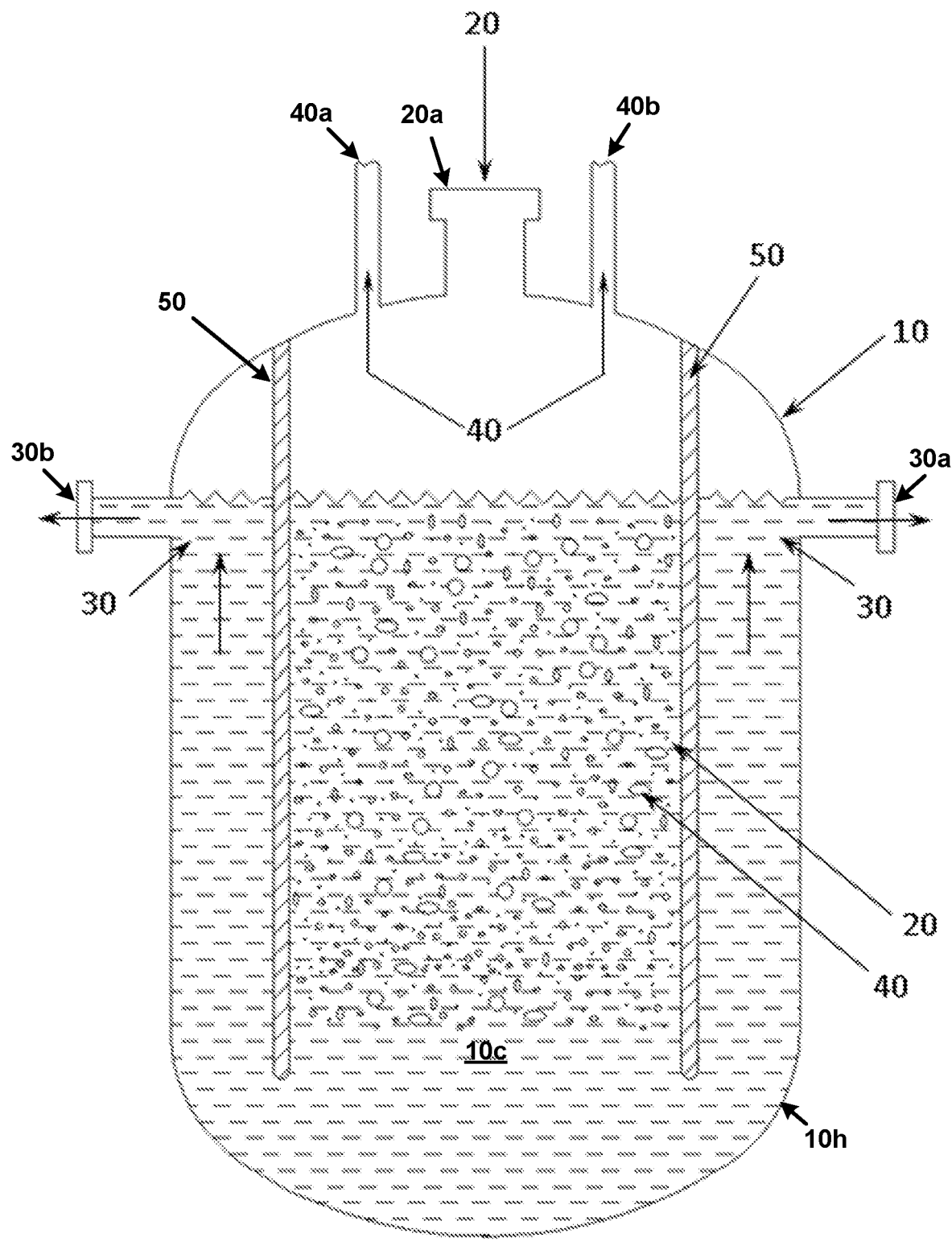
FIG. 2 is a schematic diagram of an example embodiment of a multiphase oxygen reactor.

Referring now to FIG. 2, in the thermolysis reactor vessel 10, conventionally the copper oxychloride solid particles 20 are fed into an inlet 20a of the thermolysis reactor vessel 10 to decompose thermally at a temperature of 530° C. into liquid molten CuCl salt 30 and oxygen gas 40. The thermolysis reactor vessel 10 comprises a housing 10h that encloses a reaction chamber 10c for facilitating the thermolytic reaction. The molten salt CuCl 30 is overflowed outside of the thermolysis reactor vessel 10 via overflow outlets 30a and 30b (in alternative embodiments, there may be one, or more than two overflow outlets depending on the flow rate and volume of the material that is overflowed). The term overflow means that when the copper oxychloride solid particles decompose to liquid and gas, there will be more liquid produced and the extra liquid that is produced will overflow outside of the thermolysis reactor vessel 10 and can be used for the electrochemical reaction (step 1) in the Cu—Cl cycle of hydrogen production (see FIG. 1). Baffles 50 inside the thermolysis reactor vessel 10 are used to prevent solid particles and oxygen gas from passing with the molten salt outside of the reactor 10. In cylindrical reactor vessels, the baffles can be a cylindrical shell. The thermolysis reactor vessel 10 contains the solid copper oxychloride particles 20, molten salt liquid and oxygen gas in a reaction chamber 10c where the solid decomposes to produce the liquid and the gas. The gas is removed from the thermolysis reactor vessel 10 via gas outlets 40a and 40b. The heat can be provided by a heating element (not shown) using any suitable method as is known by those skilled in the art such as, but not limited to, a thermal jacket, and an internal coil, for example.

To scale up the thermolysis reactor 10 on the basis of hydrodynamic and heat transfer, experimental studies must be performed with the actual materials of the thermolysis reactor such as molten salt CuCl and oxygen gas. Alternatively, in accordance with the teachings herein, dimensional analyses are performed in order to determine alternative materials that can be used in the experimental studies that give similar effects of the hydrodynamic and heat transfer behaviors of the actual materials but are safer and easier to use in practice.

Dimensional analysis typically involves by fixing the materials and changing the size of certain parts of the thermolysis reactor, such as the design of the airfoil. However, in accordance with the teachings herein, the dimensional analysis involves fixing the size of the thermolysis reactor and changing the materials which is difficult as there are many dimensionless variables that have to be matched at the same time as shown in Eq. 8, for example. Matching seven dimensionless numbers is a very big technical challenge and the solutions have some errors associated with them. However, this challenge may be addressed by testing many of liquids and gases at different temperatures since the multiphase flow includes two phases (i.e. liquid and gas). For example, to match the dimensionless number of the density ratio, while the density of the actual conventional liquid that is used may be large a liquid with less density such as water may be used by selecting a gas with less density than oxygen gas such as helium gas, for example, to keep the density ratio (i.e. density of the liquid divided by the density of the gas) as similar as possible to that of the actual conventional liquid. When a specific combination of liquid and gas is reached, the temperature of the gas, the temperature of the liquid or the temperature of the gas and liquid may be changed to further reduce the error and achieve the same dimensionless number which in this example is the density ratio. This process is performed for all dimensionless numbers for different liquids and gases and with different temperatures. However, an additional challenge at this point is that when the error of one dimensionless number is improved (i.e. reduced), the error of another dimensionless number may be increased. In this way, priority can be given to the most effective dimensionless number, which in this example is the density ratio. For example, if a particular dimensionless ratio does not have a significant effect on the hydrodynamic behavior of the chemical reaction, then it is given a lower priority so it may have a larger error in this substitution process. Therefore, the final selection will be the alternative materials and temperatures that can give the best error (i.e. the smallest error) for all of the dimensionless numbers.

In the studies of the thermolysis reactor, the interested particular physical quantity, in heat transfer studies is the volumetric heat transfer coefficient ($U_V$). This means that the "dependent variable" in the studies of the heat transfer in the thermolysis reactor is ($U_V$). The first step in dimensional analysis is to specify the independent parameters (Sonin, 2001) that have a significant effect on the value of ($U_V$). A total of 13 parameters (n=13) are involved in the determination of $U_V$. These parameters include gas and liquid properties (e.g., density, dynamic viscosity, surface tension, thermal conductivity, and specific heat), reactor geometry (e.g., reactor height and diameter), and flow conditions (e.g., superficial gas velocity). The functional equation of the volumetric heat transfer coefficient in terms of the complete independent parameters can be written as:

$$U_V = f(\rho_l, \rho_g, \mu_l, \mu_g, \sigma, U_{gs}, C_{p,l}, C_{p,g}, k_l, k_g, D_R, H_R), \quad (1)$$

where $\rho$ is the density, $\mu$ is the dynamic viscosity, $\sigma$ is the surface tension, $U_{gs}$ is the superficial gas velocity, $C_p$ is the specific heat, k is the thermal conductivity, $D_R$ and $H_R$ are the reactor diameter and height respectively, and the subscripts l and g denote liquid and gas respectively. The set of parameters on the right side of Eq. (1) is complete and independent. By using Buckingham's pi theorem, Eq. (1) can be converted in terms of dimensionless groups to (see details in Appendix I):

$$Nu_V = f\left(\frac{\rho_g}{\rho_l}, \frac{\mu_g}{\mu_l}, \frac{k_g}{k_l}, \frac{C_{p,g}}{C_{p,l}}, Re_l, We_l, Pr_l, \frac{H_R}{D_R}\right) \quad (2)$$

where:

$$Nu_V = \frac{U_V D_R^2}{k_l} \quad (3)$$

$$Re_l = \frac{\rho_l U_{gs} D_R}{\mu_l} \quad (4)$$

$$We_l = \frac{\rho_l U_{gs}^2 D_R}{\sigma} \quad (5)$$

$$Pr_l = \frac{C_{p,l} \mu_l}{k_l} \quad (6)$$

Since the objective of this dimensional analysis is to choose alternative materials for the actual thermolysis reactor materials, then, the dimensions of the reactor (e.g. $H_R$ and $D_R$) can be fixed in the dimensional analysis and the materials properties are changed. Thus, the number of parameters that actually vary from case to case will be 11, not 13 (since $H_R$ and $D_R$ are fixed), and the dimensionless group that can be omitted from Eq. (2) is $$\frac{H_R}{D_R}.$$

In this case Eq. (2) will become:

$$Nu_V = f\left(\frac{\rho_g}{\rho_l}, \frac{\mu_g}{\mu_l}, \frac{k_g}{k_l}, \frac{C_{p,g}}{C_{p,l}}, Re_l, \frac{Re_l^2}{We_l}, Pr_l\right) \quad (7)$$

The functional equation (Eq. (7)) can be written as:

$$Nu_V = C\left(\frac{\rho_g}{\rho_l}\right)^a \left(\frac{\mu_g}{\mu_l}\right)^b \left(\frac{k_g}{k_l}\right)^c \left(\frac{C_{p,g}}{C_{p,l}}\right)^d (Re_l)^e \left(\frac{Re_l^2}{We_l}\right)^f (Pr_l)^g, \quad (8)$$

where C, a, b, c, d, e, f and g are constants that can be determined from experiments. From Eq. (8), it can be seen that $Nu_V$ depends on both hydrodynamic and heat transfer parameters. For hydrodynamic studies, the effect of heat transfer parameters, such as $k_g$, $k_l$, $C_{p,g}$, $C_{p,l}$, and $U_V$, are neglected since these parameters do not affect hydrodynamic behaviour. By repeating the same procedure of dimensional analysis of $Nu_V$ on gas holdup ($\alpha_g$) and flow regime transition Reynolds number ($Re_{g\text{-}trans}$), these parameters can be determined as:

$$\alpha_g = C\left(\frac{\rho_g}{\rho_l}\right)^a \left(\frac{\mu_g}{\mu_l}\right)^b (Re_l)^c \left(\frac{Re_l^2}{We_l}\right)^d, \quad (9)$$

$$Re_{g\text{-}trans} = C\left(\frac{\rho_g}{\rho_l}\right)^a \left(\frac{\mu_g}{\mu_l}\right)^b (Re_l)^c \left(\frac{Re_l^2}{We_l}\right)^d, \quad (10)$$

where the constant C and the exponents a, b, c and d have different values in Eqs. (8), (9) and (10) and:

$$Re_{g\text{-}trans} = \frac{\rho_g U_{g\text{-}trans} D_R}{\mu_g} \quad (11)$$

It can be seen that Eqs. (9) and (10) have the same form as Eq. (8) when omitting heat transfer dimensionless group $\left(\frac{k_g}{k_l}, \frac{C_{p,g}}{C_{p,l}}, Pr_l, \text{ and } U_V\right)$.

In the thermolysis reactor, in order to find alternative materials that have similar effects as the actual materials for heat transfer and hydrodynamic studies, each dimensionless group in Eq. (8) for heat transfer and Eq. (9) and (10) for hydrodynamic studies, must have the same value for both the actual and alternative materials, except $Re_l$ which is adjustable by $U_{gs}$. As shown from Eq. (4), the Reynolds number ($Re_l$) depends on the superficial gas velocity ($U_{gs}$) as well as the reactor diameter, the liquid density and the dynamic viscosity. Therefore, $Re_l$ can be changed or adjusted by changing $U_{gs}$ and not only by changing the material components of the liquid.

After checking the physical properties of many liquids and gases, it was found that the alternative materials that can be used in the experiments instead of CuCl molten salt at 530° C. and oxygen gas at 530° C. are liquid water at 22±2° C. and helium gas at 90±2° C. respectively. The checking involved reviewing the physical properties of liquids and gases from a resource (such as a table or database), selecting a specific liquid and gas, determining the dimensionless parameters for the selected liquid and gas, comparing the determined dimensionless parameters for the selected liquid and gas with those of the actual materials and determining the error for each combination of selected liquid and gas until the minimum error was achieved for a specifically selected liquid and gas. In selecting the various combinations of liquids and gases during this analysis, the availability and the safety of the liquids and gases is taken into consideration. Therefore, the advantages of the selected materials are the availability and the safe usage in the lab while providing similar hydrodynamic and heat transfer characteristics compared to the conventional materials that are used in a thermolysis reactor for producing hydrogen using the thermochemical copper-chlorine (Cu—Cl) cycle.

Properties of Actual and Experimental Materials

Table 1 indicates the physical properties of both the actual and experimental fluids. The value of the surface tension of molten CuCl in contact with air is equal to 0.092 N/m at the melting temperature of CuCl (450° C.) (Janz, 1988). Since the surface tension decreases approximately linearly with temperature and is equal to zero at the critical temperature of the liquid, a linear function of CuCl surface tension with temperature can be derived as follows:

$$\sigma_{CuCl} = 0.115 - 5.076 \times 10^{-5} T \quad (1.2)$$

The predicted value of the critical temperature that is used in deriving Eq. (12) with 50% accuracy is equal to 2,435 K (Rowley et al., 2004; Zamfirescu et al., 2010). There is no change in the value of the surface tension of pure liquid light water ($H_2O$) in the presence of the non-polar (i.e. non-interacting) helium gas in comparison to air or other relatively inert gases. At the atmospheric pressure, helium has a low solubility in water (8.53 mL/L at 21.7° C. or 0.00152 g/L at 20° C.). Therefore, helium gas is not able to induce measurable surface tension changes in the polar liquid water of more than 0.1 mN/m under STP (Standard Temperature and Pressure), which is by the way, the repeatability and reproducibility of most simple tensiometers or pendant drop devices (Morrison and Johnstone, 1954).

TABLE 1

Physical properties of the actual and experimental materials.

| Physical Property | Actual Materials | | Experimental Materials | |
|---|---|---|---|---|
| | CuCl molten salt (T = 530° C.) | Oxygen gas (T = 530° C.) | Water (T = 22° C.) | Helium gas (T = 90° C.) |
| Density (ρ) | 3692 (Zamfirescu et al., 2010) | 0.4857 | 997.8 (McCutcheon et al., 1993) | 0.1344 |
| Dynamic viscosity (μ) | 0.002045 (Zamfirescu et al., 2010) | 4.25E−05 (Lemmon and Jacobsen, 2004) | 0.000975 (Reid et al., 1987) | 2.267E−05 (Petersen, 1970) |
| Specific heat ($C_p$) | 650.85 (Zamfirescu et al., 2010) | 1047.25 (Borgnakke and Sonntag, 2009) | 4180.6 (Osborne et al., 1939) | 5193 (Borgnakke and Sonntag, 2009) |
| Thermal conductivity (k) | 0.2 (Zamfirescu et al., 2010) | 0.0605 (Lemmon and Jacobsen, 2004) | 0.6 (Ramires et al., 1994) | 0.1687 (Petersen, 1970) |
| Surface tension (σ) | 0.0867 | — | 0.0724 (Vargaftik et al., 1983) | — |

Table 2 shows the values of each dimensionless group of Eq. (8) for both the actual and experimental fluids in addition to the percentage of error that is calculated for each dimensionless group. From Table 2, it can be shown that the maximum percentage error that is produced from using water liquid at 22±2° C. and helium gas at 90±2° C. instead of molten CuCl and oxygen gas at 530° C. is coming from the specific heat and is equal to 22.8%.

TABLE 2

Dimensionless groups of actual and experimental materials and the percentage of error

| Dimensionless Group | Actual Materials | Experimental Materials | Error % |
|---|---|---|---|
| $\dfrac{\rho_g}{\rho_l}$ | 0.0001315 | 0.000135 | 2.66 |
| $\dfrac{\mu_g}{\mu_l}$ | 0.02078 | 0.023 | 10.68 |
| $\dfrac{C_{p,g}}{C_{p,l}}$ | 1.609 | 1.242 | 22.8 |
| $\dfrac{k_g}{k_l}$ | 0.302 | 0.28 | 7.285 |
| $Pr_l$ | 6.66 | 6.779 | 1.786 |
| $\dfrac{Re_l^2}{We_l}$ | 76473868 ($D_R$ = 1 m) | 76085070 ($D_R$ = 1 m) | 0.508 |

The error shown in Table 2 may be reduced by selecting alternative liquids and gases. However, these alternative liquids and gases may not be cheap and/or may be rarely available and/or may not be safe. Water and helium has been selected herein due to their low cost, widespread availability and safety. Accordingly, water and helium are very desirable to be used in labs.

The experimental scale-up analysis of the thermolysis reactor 10 can be achieved by performing experiments on the alternative materials and determining the hydrodynamic and heat transfer parameters of these alternative materials such as: gas holdup ($\alpha_g$), the superficial gas velocity in the flow regime transition ($U_{g\text{-}trans}$), and the volumetric heat transfer coefficient in the thermolysis reactor ($U_V$). The hydrodynamic and heat transfer parameters of the actual thermolysis reactor can be calculated as is now described.

Gas Holdup of the Thermolysis Reactor

In Eq. (9), since each dimensionless group has approximately the same value for both helium-water and oxygen-CuCl molten salt systems, the overall gas holdup of both systems is equal, i.e.:

$$(\alpha_g)_{CuCl\text{-}O_2} = (\alpha_g)_{H_2O\text{-}He} \quad (13)$$

From Eq. (13), it can be concluded that both helium-water and oxygen-molten salt systems are similar hydrodynamically. This means that the hydrodynamic experiments that can be examined in helium-water system will give the nearly same results for the oxygen-CuCl molten salt system.

The Transition Velocity of the Thermolysis Reactor

The transition velocity of the actual materials of the oxygen reactor (i.e. molten CuCl and $O_2$ gas), can be obtained by using Eq. (10), where $Re_{g\text{-}trans}$ an of both $H_2O$—He and CuCl—$O_2$ systems are equal.

$$(Re_{g\text{-}trans})_{H_2O\text{-}He} = (Re_{g\text{-}trans})_{CuCl\text{-}O_2} \quad (14)$$

From Eq. (14) and the definition of the Reynold's number $$\left(Re_{g\text{-}trans} = \frac{\rho U_{g\text{-}trans} D_R}{\mu}\right),$$

the transition velocity of the actual materials can be expressed as:

$$(U_{g\text{-}trans})_{CuCl\text{-}O_2} = \frac{\rho_{He}}{\rho_{O_2}} \frac{\mu_{O_2}}{\mu_{He}} (U_{g\text{-}trans})_{H_2O\text{-}He}, \quad (15)$$

where $\rho_{He}$ and $\rho_{O_2}$ are the densities of helium and oxygen gases respectively and $\mu_{He}$ and $\mu_{O_2}$ are the dynamic viscosities of helium and oxygen gases respectively.

Volumetric Heat Transfer Coefficient of the Thermolysis Reactor

The volumetric heat transfer coefficient of the actual materials of the oxygen reactor (i.e. molten CuCl and $O_2$ gas), can be obtained by using Eq. (8), where $Nu_V$ of both $H_2O$—He and CuCl—$O_2$ systems are equal.

$$(Nu_V)_{H_2O-He} = (Nu_V)_{CuCl-O_2} \quad (16)$$

By substituting Eq. (3) into Eq. (16), then:

$$(U_V)_{CuCl-O_2} = \frac{(k_{sl})_{CuCl-O_2}}{(k_{sl})_{H_2O-He}} (U_V)_{H_2O-He} \quad (17)$$

where $(k_{sl})_{CuCl-O_2}$ and $(k_{sl})_{H_2O-He}$ are the slurry thermal conductivities of the CuCl—$O_2$ and $H_2O$—He systems respectively, and $(U_V)_{CuCl-O_2}$ and $(U_V)_{H_2O-He}$ are the volumetric heat transfer coefficients of the CuCl—$O_2$ and $H_2O$—He systems respectively.

Figure 3:
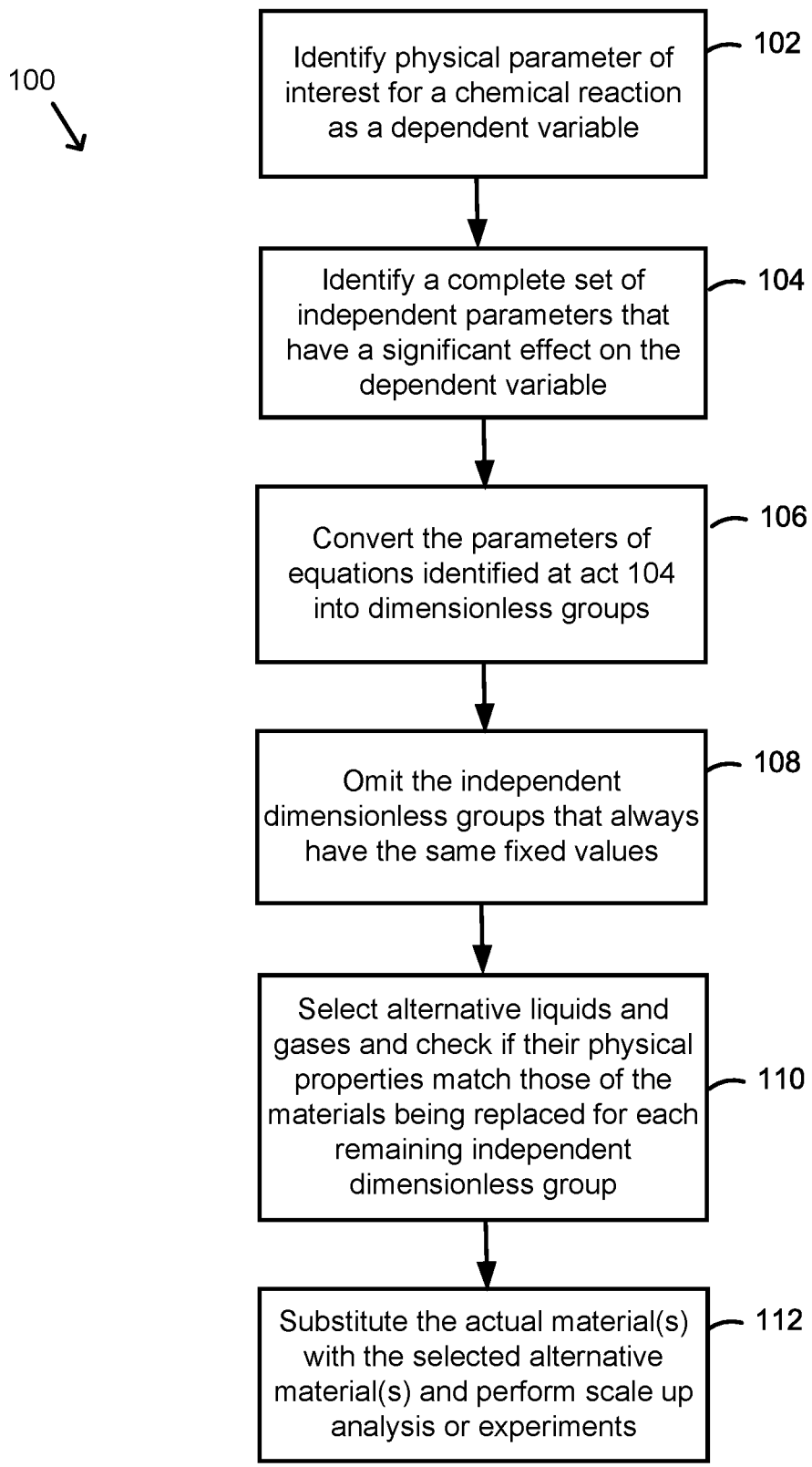
FIG. 3 is a flowchart of an example embodiment of a method for using alternative materials instead of actual materials in the scale up analysis of a reactor.

Referring now to FIG. 3, shown therein is a method 100 for determining alternative materials to use instead of one or more actual materials in the experimental hydrodynamic and heat transfer scale-up analysis. For single phase flow cases, only one material that may be challenging to use can be substituted with an alternative material. For multiphase flow cases, one or more or all of the materials may be substituted with alternative materials. In any of these cases, the substitution depends on matching the dimensionless groups as described previously as well as the availability, safety and costs of the alternative materials.

At 102, a particular physical parameter of interest for the intended study is identified as a dependent variable. For example, the parameter of interest may be one of: $U_V$ (for Heat transfer studies), $\alpha_g$ (for Hydrodynamic studies) or $U_{g\text{-}trans}$ (for Transition velocity studies).

At 104, a complete set of independent parameters that have a significant effect on the dependent variable of act 102 are identified. For example, corresponding to the identified physical parameters at act 102, the following independent parameters may be identified for each dependent variable:
$U = f(\rho_l, \mu_g, \mu_l, \mu_g, \sigma, C_{pl}, C_{pg}, k_l, k_g, D_R, H_R, d_o)$;
$\alpha_g = f(\rho_l, \rho_g, \mu_l, \mu_g, \sigma, U_{gs}, D_R, H_R, d_o)$; or
$Re_{g\text{-}trans} = f(\rho_l, \rho_g, \mu_l, \mu_g, \sigma, U_{gs}, D_R, H_R, d_o)$.

At 106, Buckingham's pi theorem may be used to convert the parameters of the equations identified at act 104 into dimensionless groups. Continuing with the example identified dependent variable, some example dimensionless groups are:

$$Nu_V = f\left(\frac{\rho_g}{\rho_l}, \frac{\mu_g}{\mu_l}, \frac{k_g}{k_l}, \frac{C_{p,g}}{C_{p,l}}, Re_l, We_l, Pr_l, \frac{H_R}{D_R}, \frac{d_o}{D_R}\right);$$

$$\alpha_g = f\left(\frac{\rho_g}{\rho_l}, \frac{\mu_g}{\mu_l}, Re_l, We_l, \frac{H_R}{D_R}, \frac{d_o}{D_R}\right); \text{ or}$$

$$Re_{g\text{-}trans} = f\left(\frac{\rho_g}{\rho_l}, \frac{\mu_g}{\mu_l}, Re_l, We_l, \frac{H_R}{D_R}, \frac{d_o}{D_R}\right).$$

At 108, the independent dimensionless groups that always have the same fixed values are omitted, such as:

$$\frac{H_R}{D_R} \text{ and } \frac{d_0}{D_R}$$

from the examples of act 106.

At 110, select different combinations of alternative liquids and/or gases for the one or more actual materials that are to be substituted and check if the physical properties of the selected alternative liquid and gas combinations match those of each remaining independent dimensionless group when using the actual materials that are being replaced by the alternative liquid and gas (i.e. remaining after act 108). The alternative materials that have approximately the same values for each independent dimensionless group as the values of the actual materials can be used instead of the actual materials in experiments. Continuing with the example, the dependent dimensionless numbers such as; $Nu_V$, $\alpha_g$, and $Re_{g\text{-}trans}$ will approximately have the same values for both the actual and alternative materials.

At 112, the one or more actual materials (that were selected for substitution) are substituted with the selected one or more alternative materials and experimental runs for scale up analysis can be performed using the alternative materials and alternative operating conditions depending on the particulars of the situation at hand.

Therefore, the method described in accordance with the teachings herein can be used for doing experiments to scale-up the thermolysis reactor from the perspectives of hydrodynamics and heat transfer, by using the alternative materials. The alternative materials that are selected can be safe and low cost. Accordingly, the experiments with the alternative materials will be safe and low cost and will give the same results as the actual materials which are not readily available and are dangerous to use. In experimental work for multiphase flows, alternative materials that can be treated easily and safely in the experiments, can be used for each phase.

The selection of the alternative materials depends on the type of the study that is performed for the multiphase flows by examining only the parameters that affect the study. For example, to study hydrodynamics and heat transfer, the alternative materials can be specified from the dimensional analysis of the parameters that these studies depend on, as was shown in the thermolysis reactor example.

In studies of the hydrodynamics and heat transfer characteristics of multiphase flows, the same alternative materials are selected because of the direct effects of these studies on each other. For example, when studying the heat transfer characteristics, specific alternative materials are selected. In order to study the hydrodynamics characteristics, the same alternative materials used in the heat transfer study are selected because of the direct effect of hydrodynamics behavior on heat transfer behavior. That means the independent parameters that affect the hydrodynamic study will affect the heat transfer study as is shown in Eqs. (8), (9), and (10).

The alternative materials can be selected by using dimensional analyses of Buckingham pi theorem. The dimensional analyses using the Buckingham pi theorem can be performed by fixing the dimensions of the system and changing the materials of the system. For the Cu—Cl cycle example, the dimensionless numbers that are obtained from the experiments with the alternative materials ($Nu_V$, $\alpha_g$, $Re_{g\text{-}trans}$) will be the same as those of actual materials.

The experimental runs using the alternative materials can be performed using a reactor vessel with a simple design. For example, a cylindrical reactor vessel that contains liquid water at 22±2° C. at a certain height within the reactor to emulate the behaviour of CuCl molten salt at 530° C. Helium gas at 90±20° C. is then injected from the bottom of the reactor to emulate the upward motion of the oxygen gas at 530° C. after it is conventionally produced by the decomposition process. The Helium gas can be injected at different speeds to study the hydrodynamics behavior. The two alternative materials and their associated operating conditions avoid the use of CuCl molten salt at 530° C. and oxygen gas at 530° C. while emulating their hydrodynamic and heat transfer properties.

Accordingly, the methods described in accordance with the teachings herein represent a unique tool for testing the hydrodynamic and heat transfer behaviors in an experimental environment prior to the adaption into the thermolysis reactor of the Cu—Cl cycle.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

Appendix I—Details of Dimensional Analysis

In this section, the dimensional analysis is performed by using Buckingham pi theorem as follows (Sonin, 2001):
1—Identifying independent parameters of the studied system: The number of independent parameters (n) of the heat transfer study is 14 parameters as specified in Eq. (1).
2—Specifying the basic dimensions according to FLTθ unit system: The number of basic dimensions (k) is 4. The basic dimensions involved in the studies of $U_V$ and $\alpha_g$ are summarized in the Table I.1.

TABLE I.1

Basic dimensions of the parameters involved in hydrodynamic and heat transfer studies of thermolysis reactor.

| Parameter | Basic Dimensions |
| --- | --- |
| $\rho_l, \rho_g$ | F L$^{-4}$ T$^2$ |
| $\mu_l, \mu_g$ | F L$^{-2}$ T |
| $\sigma$ | F L$^{-1}$ |
| $U_{gs}$ | L T$^{-1}$ |
| $C_{pl}, C_{pg}$ | L$^2$ T$^{-2}$ θ$^{-1}$ |
| $k_l, k_g$ | F T$^{-1}$ θ$^{-1}$ |
| $D_R, H_R, d_o$ | L |
| $U_V$ | F L$^{-2}$ T$^{-1}$ θ$^{-1}$ |
| $\alpha_g$ | 1 |

3—Calculating the number of dimensionless parameters (Π groups) in the thermolysis reactor system:

$$n-k=14-4=10 \quad (I.1)$$

4—Selecting the repeating parameters: In the study of $U_V$, the four selected repeating parameters are $\rho_l, \mu_l, k_l$ and $D_R$.
5—Calculating the dimensionless groups (Π groups): The results of π groups are shown in Table I.2.

TABLE 1.2

Dimensionless groups involved in heat transfer and hydrodynamic studies.

Dimensionless group $$\Pi_1 = \frac{U_V D_R^2}{k_l}$$

$$\Pi_2 = \frac{\rho_g}{\rho_l}$$

TABLE 1.2-continued

Dimensionless groups involved in heat transfer and hydrodynamic studies.

Dimensionless group $$\Pi_3 = \frac{\mu_g}{\mu_l}$$

$$\Pi_4 = \frac{\sigma \rho_l D_R}{\mu_l^2} = \frac{Re_l^2}{We_l}$$

$$\Pi_5 = \frac{U_{gs} \rho_l D_R}{\mu_l} = Re_l$$

$$\Pi_6 = \frac{H_R}{D_R}$$

$$\Pi_7 = \frac{d_o}{D_R}$$

$$\Pi_8 = \frac{k_g}{k_l}$$

$$\Pi_9 = \frac{C_{pl} \mu_l}{k_l} = Pr_l$$

$$\Pi_{10} = \frac{C_{pg} \mu_l}{k_l}$$

$$\frac{\Pi_{10}}{\Pi_9} = \frac{C_{pg}}{C_{pl}}$$

After determining the π groups and doing some mathematical operations on Π's, Eq. (1) can be written as;

$$Nu_V = f\left(\frac{\rho_g}{\rho_l}, \frac{\mu_g}{\mu_l}, \frac{k_g}{k_l}, \frac{C_{p,g}}{C_{p,l}}, Re_l, \frac{Re_l^2}{We_l}, Pr_l, \frac{H_R}{D_R}, \frac{d_o}{D_R}\right), \quad (1.2)$$

where $Nu_V = \frac{U_V D_R^2}{k_l}$, $Re_l = \frac{\rho_l U_{gs} D_R}{\mu_l}$, $We_l = \frac{\rho_l U_{gs}^2 D_R}{\sigma}$ and $$Pr_l = \frac{C_{p,l} \mu_l}{k_l}$$

REFERENCES

Abdulrahman, M. W. (2016a). Similitude for thermal scale-up of a multiphase thermolysis reactor in the cu-cl cycle of a hydrogen production. *World Academy of Science, Engineering and Technology, International Journal of Electrical, Computer, Energetic, Electronic and Communication Engineering*, 10 (5), 567-573.

Abdulrahman, M. W. (2016b). Heat transfer analysis of a multiphase oxygen reactor heated by a helical tube in the cu-cl cycle of a hydrogen production. *World Academy of Science, Engineering and Technology, International Journal of Mechanical, Aerospace, Industrial, Mechatronic and Manufacturing Engineering*, 10 (6), 1018-1023.

Borgnakke, C., & Sonntag, R. E. (2009). *Fundamentals of Thermodynamics* (7$^{th}$ ed.). USA: John Wiley & Sons, Inc.

Janz, G. J. (1988). Thermodynamic and transport properties for molten salts: Correlation equations for critically evaluated density, surface tension, electrical conductance, and viscosity data. *Journal of Physical and Chemical Reference Data*, 17, Supplement No. 2.

Lemmon, E. W., & Jacobsen, R. T. (2004). Viscosity and thermal conductivity equations for nitrogen, oxygen, argon, and air, *International Journal of Thermophysics*, 25, (1), 21-69.

Lewis, M. A., Serban, M., & Basco, J. K. (2003). Generating hydrogen using a low temperature thermochemical cycle. *Proceedings of the ANS/ENS Global International conference on Nuclear Technology*, New Orleans.

Marin, G. D. (2012). Kinetics and transport phenomena in the chemical decomposition of copper oxychloride in the thermochemical Cu—Cl cycle (Doctoral dissertation). University of Ontario Institute of Technology, Ontario, Canada.

McCutcheon, S. C., Martin, J. L., & Barnwell, T. O. (1993). Water quality. In D. R. Maidment (Editor), *Handbook of Hydrology* (p. 11.3). New York: McGraw-Hill.

Morrison, T. J., & Johnstone, N. B. (1954). Solubilities of the inert gases in water. *Journal of Chemical Society*, 3441-3446.

Naterer, G. F., Gabriel, K., Wang, Z. L., Daggupati, V. N., & Gravelsins, R. (2008b). Thermochemical hydrogen production with a copper-chlorine cycle. I: Oxygen release from copper oxychloride decomposition. *International Journal of Hydrogen Energy*, 33, 5439-5450.

Osborne, Stimson, & Ginnings, B (1939). *Handbook of Chemistry and Physics* of S. Jour. Res., 23, 238. In, 53rd ed., Cleveland, Ohio, D128 (1972-1973).

Petersen, H. (1970, September). The properties of helium: Density, specific heats, viscosity, and thermal conductivity at pressures from 1 to 100 bar and from room temperature to about 1800 K. Risö Report No. 224. Danish atomic energy commission research establishment Risö.

Ramires, M. L. V., Nieto de Castro, A., Nagasaka, Y., Nagashima, A., Assael, M. J., Wakeham, W. A. (1994). Standard reference data for the thermal conductivity of water. *American Institute of Physics and the American Chemical society*.

Reid, R. C., Prausnitz, J. M., & Poling, B. E. (1987). *Properties of gases and liquids*, New York: McGraw-Hill.

Rowley, R. L., Wilding, W. V., Oscarson, J. L., Yang, Y., Zundeland, N. A., Daubert, T. P. (2004). *DIPPR data compilation of pure chemical properties*. New York: Taylor & Francis.

Serban, M., Lewis, M. A., & Basco, J. K. (2004, April). Kinetic study of the hydrogen and oxygen production reactions in the copper-chloride thermochemical cycle. *American Institute of Chemical Engineers Journal*, Spring National Meeting, New Orleans, La., pp. 2690-2698.

Sonin, A. A. (2001). *The physical basis of dimensional analysis* ($2^{nd}$ ed.), Department of Mechanical Engineering, Cambridge.

Vargaftik, N. B., Volkov, B. N., & Voljak, L. D. (1983). International tables of the surface tension of water. Moscow Aviation Institute, Moscow, U.S.S.R. *Journal of Physical and Chemical Reference Data*, 12 (3), 817-820.

Zamfirescu, C., Dincer, I., & Naterer, G. F. (2010). Thermophysical properties of copper compounds in copper-chlorine thermochemical water splitting cycles. *International Journal of Hydrogen Energy*, 35, 4839-4852.

The invention claimed is:

1. A method of scaling-up a thermolysis reactor for producing hydrogen using the thermochemical copper-chlorine (Cu—Cl) cycle by experimenting with two alternative materials instead of two actual materials that are used in the reactor, wherein the method comprises:
   performing the scale-up analysis study on hydrodynamics and heat transfer behavior;
   identifying a set of parameters that affect both of the hydrodynamic and heat transfer studies; and
   performing dimensionless analyses on the set of parameters to identify the dimensionless groups using Buckingham's pi theorem;
   wherein
   performing the dimensionless analyses comprise fixing the dimensions of the reactor and substituting the materials used in the reactor.

2. The method of claim 1, wherein the act of performing dimensionless analysis comprises:
   omitting dimensionless groups having fixed values; and
   selecting the two alternative materials when each of the independent dimensionless group for hydrodynamic and heat transfer studies have the same value for both the actual and alternative materials.

3. The method of claim 2, wherein the two alternative materials comprise liquid water at 22±2° C. instead of CuCl molten salt at 530° C. and helium gas at 90±2° C. instead of oxygen gas at 530° C.

4. The method of claim 1, wherein the dimensionless groups comprise dimensionless numbers that are obtained from experiments with the alternative materials and which comprise $Nu_V$, $\alpha_g$, and $Re_{g\text{-}trans}$.

* * * * *